(12) United States Patent
Ozaki et al.

(10) Patent No.: US 10,655,787 B2
(45) Date of Patent: May 19, 2020

(54) VALVE MECHANISM FOR HIGH PRESSURE TANK AND VALVE DEVICE FOR HIGH PRESSURE TANK

(71) Applicant: HONDA MOTOR CO., LTD., Tokyo (JP)

(72) Inventors: Hiroyasu Ozaki, Wako (JP); Koichi Takaku, Wako (JP); Koichi Kato, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 39 days.

(21) Appl. No.: 15/441,237

(22) Filed: Feb. 24, 2017

(65) Prior Publication Data

US 2017/0248274 A1  Aug. 31, 2017

(30) Foreign Application Priority Data

Feb. 26, 2016  (JP) .................................. 2016-035569

(51) Int. Cl.
*F17C 13/04* (2006.01)
*F16K 1/30* (2006.01)
*F16K 1/02* (2006.01)

(52) U.S. Cl.
CPC ................ *F17C 13/04* (2013.01); *F16K 1/02* (2013.01); *F16K 1/302* (2013.01);
(Continued)

(58) Field of Classification Search
CPC ................ F17C 13/04; F17C 2250/043; F17C 2205/0394; F17C 2205/0382;
(Continued)

(56) References Cited

U.S. PATENT DOCUMENTS 3,292,895 A * 12/1966 Leger et al. ..................... 251/83
3,589,397 A *  6/1971 Wagner ....................... 137/614.2
(Continued)

FOREIGN PATENT DOCUMENTS

FR   1370689    *  9/2002
GB   2180037    *  3/1987
(Continued)

OTHER PUBLICATIONS

Japanese Office Action for corresponding JP Application No. 2016-035569, dated Jan. 16, 2018 (w/ English machine translation).
(Continued)

*Primary Examiner* — Marina A Tietjen
(74) *Attorney, Agent, or Firm* — Mori & Ward, LLP (57) ABSTRACT

A valve mechanism includes a first plunger, a second plunger, a seal member, and a valve element. The first plunger has a thread engaging with a threaded portion provided on an inner wall of the flow passage. The first plunger is movable along the axis by rotating around the axis. The second plunger has a first end and a second end. The first end engages with the first plunger such that the first plunger is relatively rotatable with respect to the second plunger. The second plunger is movable along the axis by rotating the first plunger. The seal member is provided to surround the second plunger. The valve element has a back end engaging with the second end such that the valve element is movable along the axis according to movement of the second plunger so as to be seated on and separated from a valve seat.

12 Claims, 5 Drawing Sheets

(52) U.S. Cl.
CPC ............... *F17C 2205/0326* (2013.01); *F17C 2205/0329* (2013.01); *F17C 2205/0335* (2013.01); *F17C 2205/0385* (2013.01); *F17C 2205/0394* (2013.01); *F17C 2221/012* (2013.01); *F17C 2223/0123* (2013.01); *F17C 2223/036* (2013.01); *F17C 2250/043* (2013.01); *F17C 2270/0178* (2013.01); *F17C 2270/0184* (2013.01)

(58) Field of Classification Search
CPC ...... F17C 2205/0385; F17C 2205/0329; F17C 2205/0326; F16K 1/02; F16K 1/08; F16K 1/302; F16K 17/04
See application file for complete search history.

(56) References Cited

U.S. PATENT DOCUMENTS

| | | | |
|---|---|---|---|
| 5,823,509 A * | 10/1998 | Daniels | 251/335.2 |
| 6,453,933 B1 * | 9/2002 | Oi et al. | 137/242 |
| 6,607,007 B1 * | 8/2003 | Hull et al. | 137/613 |
| 7,322,558 B2 * | 1/2008 | Cong | 251/82 |

FOREIGN PATENT DOCUMENTS

| | | |
|---|---|---|
| JP | 52-026665 U | 2/1977 |
| JP | 07-301359 | 11/1995 |
| JP | 10-227370 | 8/1998 |
| JP | 2010-247548 | 11/2010 |

OTHER PUBLICATIONS

Japanese Office Action for corresponding JP Application No. 2016-035569, dated May 29, 2018 (w/ English machine translation).
Japanese Office Action for corresponding JP Application No. 2016-035569, dated Sep. 11, 2018 (w/ machine translation).

* cited by examiner

VALVE MECHANISM FOR HIGH PRESSURE TANK AND VALVE DEVICE FOR HIGH PRESSURE TANK

CROSS-REFERENCE TO RELATED APPLICATIONS

The present application claims priority under 35 U. S. C. § 119 to Japanese Patent Application No. 2016-035569, filed Feb. 26, 2016. The contents of this application are incorporated herein by reference in their entirety.

BACKGROUND

Field of the Invention

The present invention relates to a valve mechanism for a high pressure tank and a valve device for a high pressure tank.

Discussion of the Background

In a high pressure tank to be used for a fuel cell powered vehicle and a stationary fuel cell, high pressure hydrogen of several dozens of MPa is stored. Therefore, the high pressure is applied also to a piping system connecting to the high pressure tank. When assembling the fuel cell powered vehicle or at the time of maintenance, the so-called airtightness inspection is carried out in order for confirming whether or not there is any leakage in the piping system. Concretely, high pressure fluid is filled into the piping system, and presence or absence of the leakage of the fluid from the piping system is inspected.

At the time of inspection, the hydrogen and the like as fuel is not used, inert gas such as helium and the like is used. In the airtightness inspection, a valve device (manual valve) for airtightness inspection is required to be fitted in the high pressure tank so as not to allow the inert gas to enter the high pressure tank. As the valve device for the airtightness inspection there is a manual safety restraint valve as disclosed in a Japanese Patent Application Laid-Open Publication No. H07-301359. This manual safety restraint valve is arranged in a gas flow passage. A threaded stem is rotated so as to tighten a resilient gasket against a second valve seat.

SUMMARY OF THE INVENTION

According to one aspect of the present invention, a valve mechanism for a high pressure tank, which is accommodated in a valve accommodating hole communicating with a flow passage through which prescribed fluid flows, includes a first plunger, a second plunger, a seal member, and a valve element. The first plunger is configured to be engaged with a threaded portion formed on at least a part of an inner wall of the valve mechanism accommodating hole and to be moved by rotation in the valve mechanism accommodating hole. The second plunger is configured to be engaged at one end thereof with the first plunger in a relatively rotatable manner. The seal member is in contact with a periphery of the second plunger. The valve element is configured to be engaged with the other end of the second plunder and to be seated on and separated from a valve seat which is formed in the flow passage.

According to another aspect of the present invention, a valve mechanism includes a first plunger, a second plunger, a seal member, and a valve element. The first plunger is provided in a flow passage and has a thread around an axis of the first plunger. The thread is engaging with a threaded portion provided on an inner wall of the flow passage. The first plunger is movable along the axis by rotating around the axis. The second plunger is provided in the flow passage and has a first end and a second end opposite to the first end along the axis. The first end engages with the first plunger such that the first plunger is relatively rotatable with respect to the second plunger. The second plunger is movable along the axis by rotating the first plunger. The seal member is provided to surround the second plunger around the axis so as to contact a circumferential outer surface of the second plunger. The valve element is provided in the flow passage and has a forward end and a back end opposite to the forward end along the axis. The back end engages with the second end of the second plunger such that the valve element is movable along the axis according to movement of the second plunger so as to be seated on and separated from a valve seat which is provided in the flow passage.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIG. 1 is a schematic diagram showing a valve device, a high pressure tank, a piping system and a fuel cell stack in accordance with an embodiment of the present invention.

FIG. 2 is across sectional view of the valve device in accordance with the embodiment of the present invention, showing a state in which the valve device allows a flow passage to be communicated.

FIG. 3 is a cross sectional view of the valve device shown in FIG. 2 showing a state in which the valve device shuts off the flow passage.

FIG. 4 is a cross sectional view schematically illustrating pressures applied to a valve element of a valve mechanism shown in FIG. 3.

FIG. 5 is an exploded perspective view showing an overview of the whole valve mechanism.

DESCRIPTION OF THE EMBODIMENTS

The embodiments will now be described with reference to the accompanying drawings, wherein like reference numerals designate corresponding or identical elements throughout the various drawings.

Hereunder, an embodiment of the present invention will be explained with reference to accompanying drawings. In the following explanation, while the term “axial direction” is used appropriately, it means the direction extending along a center axis in the longitudinal direction of a valve mechanism 1 or a valve mechanism accommodating hole 90. Similarly, while the term “high pressure tank” is used, a tank in which fluid of higher pressure than at least atmospheric pressure is stored, is included within the high pressure tank of the present embodiment.

FIG. 1 is a schematic diagram showing a valve device in accordance with an embodiment of the present invention, a high pressure tank 101, a piping system 111 and a fuel cell stack 121. The high pressure tank 101 is a high pressure tank for storing high pressure hydrogen, although not limited to this. In the case of the high pressure tank 101 used for a fuel cell powered vehicle, it is required to endure the pressure of about 70 Mpa. Moreover, it is required to have resistance to hydrogen. Therefore, the high pressure tank is made of resin material or aluminum. A body 80 is screwed with a mouthpiece potion 103 of the high pressure tank 101 so as to seal the mouthpiece portion 103. In the interior of the body 80, there is provided an electromagnetic type in-tank electromagnetic valve 105 which communicates with an internal space 102 of the high pressure tank 101. In addition, a valve device 8 of this embodiment is provided on a downstream side of the in-tank electromagnetic valve 105 through a first flow passage 85*a*. The valve device 8 of this embodiment is a manual valve which is manually operable from the outside of the body 80. A second flow passage 85*b* is formed on a downstream side of the valve device 8. Herein, in the following explanation, the first flow passage 85*a* and the second flow passage 85*b* may be referred to as a flow passage 85, in combination of both.

A filling flow passage 107 for filling fluid from the outside is provided in the second flow passage 85*b*. A check valve is provided in an intermediate position of the filling flow passage 107 so as to prevent the fluid from leaking out through the filling flow passage 107 from the second flow passage 85*b*. From the filling flow passage 107, hydrogen to be stored in the high pressure tank 101 is filled and further high pressure fluid (normally, inert gas) for an airtight inspection is filled. Moreover, main piping 113 for supplying hydrogen to a fuel cell stack 121 is connected to the second flow passage 85*b*. To the main piping 113 there are connected a regulator 115, pressure gauges 116 and 117 and a control valve 119 in the order named from the side of the body 80. The regulator 115 is configured to adjust (decompress) the pressure of hydrogen supplied from the high pressure tank 101. The pressure gauge 116 is configured to measure the pressure of hydrogen before adjustment, while the pressure gauge 117 is configured to measure the pressure of hydrogen after adjustment. The control valve 119 is configured to control (or shut off) the supply of hydrogen to the fuel cell stack 121.

In a normal use mode, the opening and closing of the in-tank electromagnetic valve 105 is controlled by a control signal from a control section not shown in the drawing. Further, the valve device 8 of this embodiment is always in a closed condition. On the other hand, in the case of assembling and maintaining the piping system 111 and in the case of carrying out the airtight inspection, the valve device 8 is manually operated, and the first flow passage 85*a* and the second flow passage 85*b* are shut off. This is because the high pressure fluid for the airtight inspection enters the interior of the high pressure tank 101 through the first flow passage 85*a* when the first flow passage 85*a* and the second flow passage 85*b* are not shut off.

[Overall Configuration of Valve System]

Next, the overall configuration of the valve device 8 will be explained with reference to FIGS. 2 and 3. In the following explanation, while the term "engagement" is used, it shall not be interpreted narrowly. In other words, the term "engagement" is not limited to such an engaging configuration between a flange portion 35 of a first plunger 3 and one end engaging part 52 or such an engaging configuration between the other end engaging part 54 and a valve element head portion 77 as referred to with respect to the following embodiment. For example, such a configuration that the first plunger 3 is simply contacted with one end of a second plunger so as to apply thrust (force in the valve closing direction) to the second plunger 5 or such a configuration that the other end of the second plunger 5 is simply contacted with the valve element 7 so as to apply thrust to the valve element 7 may be included. Further, such a configuration that the first plunger 3 and the valve element 7 are connected by a wire is included in the "engagement". In addition, the engagement between the first plunger 3 and the second plunger 5, and the engagement between the second plunger 5 and the valve element 7 do not rest on the premise that they are always in contact with each other. According to the conditions, there may be cases where the first plunger 3 and the second plunger 5 are not in a direct contact relation, and there may be cases where the second plunger 5 and the valve element 7 are not in a direct contact relation.

The valve device 8 includes the valve mechanism 1 and the body 80 which holds the valve mechanism 1. The body 80 includes a valve holder 81 which holds the first plunger 3 in the interior thereof, and a valve body 83 to which the valve holder 81 is fitted. In addition, the flow passage 85 through which the prescribed fluid flows is formed in the interior of the body 80. Then, the valve mechanism 1 is configured to switch between the communication and the shut off of the flow passage 85.

[Valve Holder]

Figure 2:
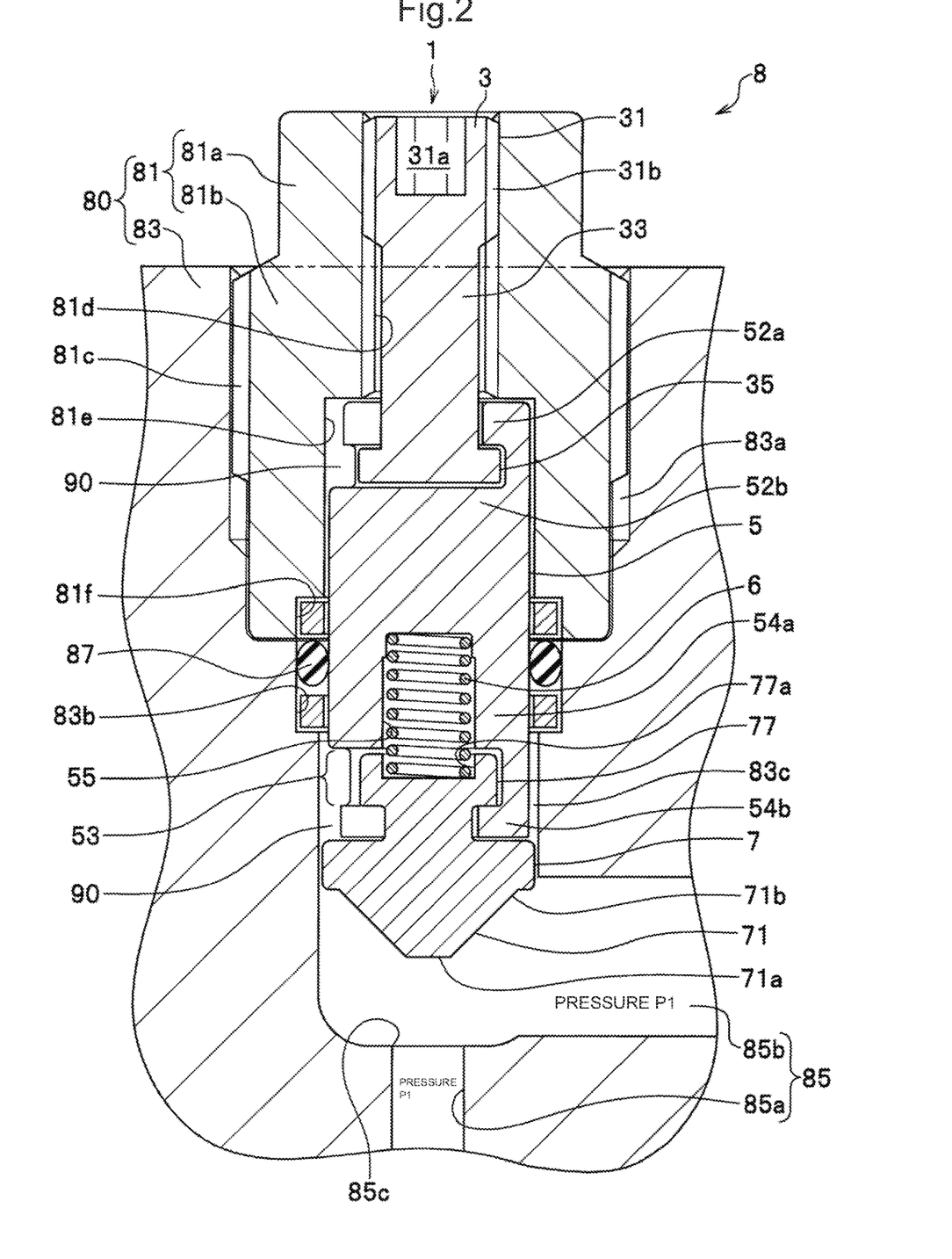
Figure 3:
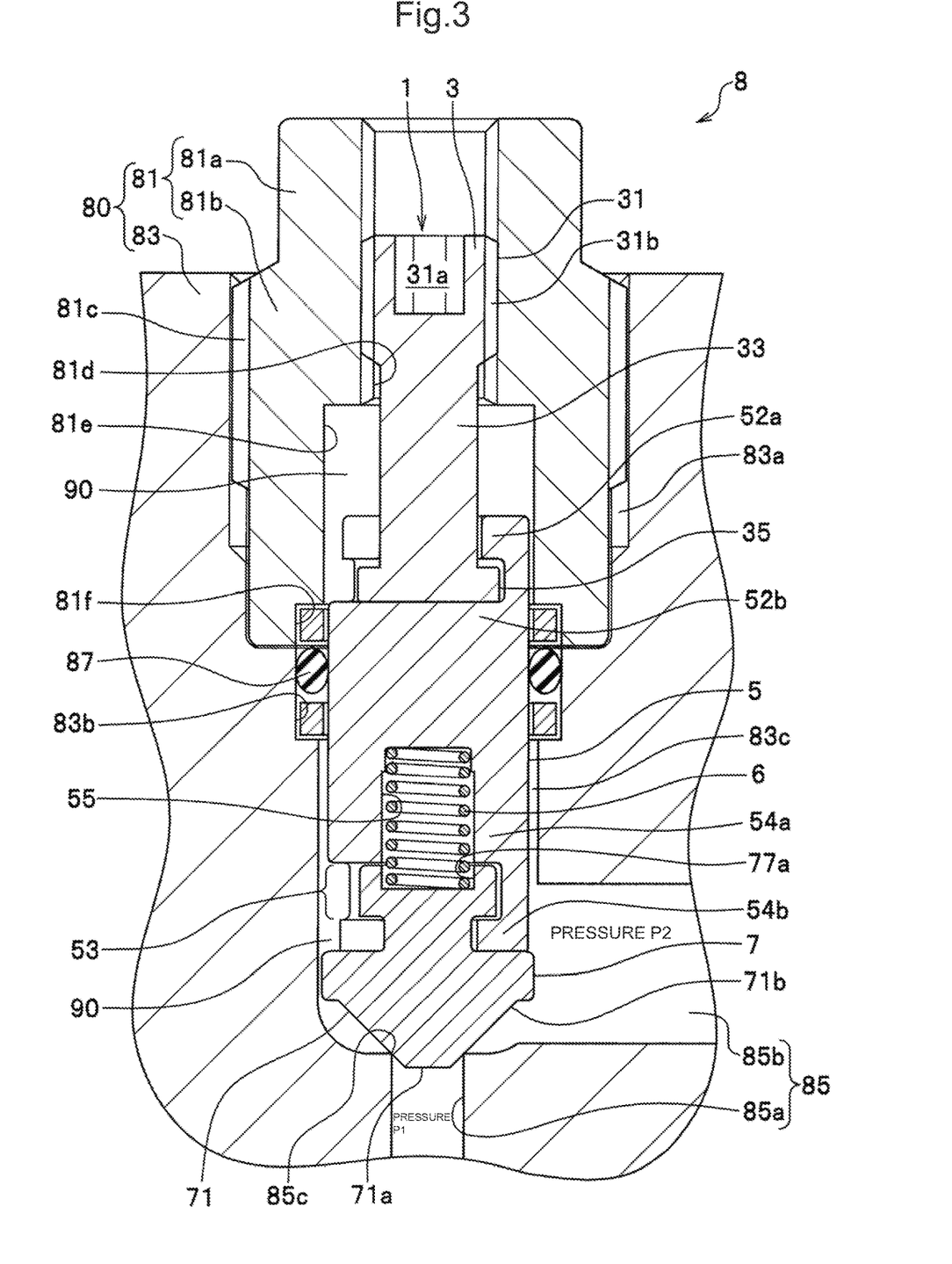

The valve holder 81 is a member of substantially cylindrical shape, of which a small diameter part 81*a* on the upper side of the drawing and a large diameter part 81*b* on the lower side are integrally formed with each other (in FIG. 2, represented while partitioning it up and down by a phantom line, for convenience of explanation). A valve holder male threaded portion 81*c* is formed on an outer peripheral surface of the large diameter part 81*b*. The valve holder male threaded portion 81*c* is not formed on the whole surface of the outer peripheral surface of the large diameter part 81*b* but formed in an upper half region of the large diameter part 81*b*. However, the valve holder male threaded portion 81*c* may be formed on the whole surface of the outer peripheral surface of the large diameter part 81*b*. Herein, since a threaded portion is not formed in a lower half region of the large diameter part 81*b*, the lower half region is slightly smaller in diameter than the valve holder male threaded portion 81*c* by a height of the screw thread.

The interior of the valve holder 81 is hollow and is composed of a valve holder female threaded portion 81*d*, a large diameter hole 81*e* and a first seal member hole 81*f* in the order named from the upper side of the valve holder 81. These valve holder female portion 81*d*, large diameter hole 81*e* and first seal member hole 81*f* constitute a part of the valve mechanism accommodating hole 90. With respect to diameter of each portion, the diameter of the valve holder female threaded portion 81*d* is smallest, and the diameter of the first seal member hole 81*f* is largest. The inner diameter of the valve holder female threaded portion 81*d* corresponds to the diameter of the male threaded portion 31*b* formed in the first plunger 3 of the valve mechanism 1. Therefore, the first plunger 3 is screwed with the valve holder female threaded portion 81*d*. The valve holder female threaded portion 81*d* is formed in the range from an upper end portion of the valve holder 81 to about a half position in the height direction thereof. Accordingly, the first plunger 3 is allowed to move, while rotating, in the axial direction in the range of the valve holder female threaded portion 81*d*.

The large diameter hole 81*e* is a hole of a columnar shape, and the second plunger 5 of the valve mechanism 1 is accommodated within the large diameter hole 81*e*. Therefore, the diameter of the large diameter hole 81*e* is formed slightly larger than the diameter of the second plunger 5. The second plunger 5 within the large diameter hole 81*e* is engaged at its one end (upper end) with the first plunger 3. Therefore, the second plunger 5 is configured to move along with the first plunger 3 within the large diameter hole 81*e*. However, when the one end (upper end) of the second plunger 5 comes into contact with the upper end portion of the large diameter hole 81, it is not able to move further upward.

The first seal member hole 81f is a hole for arranging a seal member (for example, an O-ring and a back up ring) 87. In this embodiment, when the second plunger 5 is arranged in the large diameter hole 81e, a ring shaped space is formed on the outside of the second plunger 5. When the seal member 87 is arranged within the ring shape space, the seal member 87 is configured to come into contact with the periphery of the second plunger 5. However, in this embodiment, as referred to later, the seal member 87 is arranged on the side of the valve body 83.

[Valve Body]

Next, the valve body 83 will be explained. FIG. 2 shows a part of the valve body 83, namely, a part in which the valve mechanism 3 is provided. A valve body female threaded portion 83a is formed in the valve body 83. This valve body female threaded portion 83a is provided for mounting the valve holder 81. More precisely, the inner diameter of the valve body female threaded portion 83a corresponds to the diameter of the valve holder male threaded portion 81c. Therefore, when the valve holder 81 is screwed into the valve body female threaded portion 83a, the valve holder 81 is secured to the valve body 83. In addition, a valve holder accommodating hole for accommodating a lower part of the valve holder 81 is formed below the valve body female threaded portion 83.

Further, a space constituting a part of the valve mechanism accommodating hole 90 is formed below the valve holder 81. The valve mechanism accommodating hole 90 formed in the valve body 83 includes a second seal member hole 83b and a columnar space 83c. The second seal member hole 83b has an inner diameter equal to that of the first seal member hole 81f. Therefore, a prescribed ring shaped clearance is formed between the second seal member hole and an outer peripheral surface of the second plunger 5. The seal member 87 is arranged around the periphery of the second plunger 5 within this clearance. When the seal member 87 is arranged, a space formed by the second seal member hole 83b and the second plunger 5 is blocked between the first plunder 3 side and the valve element 7 side. Therefore, it is possible to maintain an upper space which is open to atmosphere and a lower space which has a prescribed higher pressure than an atmospheric pressure, on either side of the seal member 87.

Further, the flow passage 85 of the valve body 83 includes the first flow passage 85a which communicates with the internal space 102 of the high pressure tank 101 and the second flow passage 85b which communicates with the exterior (for example, the piping system 111 for supplying hydrogen) of the high pressure tank 101. The first flow passage 85b is arranged coaxially with the valve mechanism accommodating hole 90 so as to face toward the valve element 7. The diameter of the first flow passage 85a is set so as to correspond to an inverted truncated cone shape of the valve element 7. More precisely, the diameter of the first flow passage 85a is larger than the diameter of a small diameter portion 71a of an inverted truncated cone shaped valve portion 71 of the valve element 7 and smaller than the diameter of a large diameter portion 71b thereof. In addition, since a taper surface of the valve portion 71 of the valve element 7 is configured to come into contact with an end portion (an upper end portion in the drawing) of the first flow passage 85a (see FIG. 3), the valve seat 85c is provided on the boundary between the first flow passage 85a and the second flow passage 85.

By the way, the diameter of the first flow passage 85a is not required to satisfy the above described conditions over the entire length thereof. At least the end of the first flow passage 85a serving as the valve seat 85c needs to satisfy the above conditions, and other portions of the first flow passage 85a may be formed in the different diameter. Further, in this embodiment, although the valve mechanism accommodating hole 90 and the first flow passage 85a are formed coaxially, this is not essential. That is to say, it is sufficient that the valve seat 85c is located in a position opposed to the valve element 7, and the first flow passage 85a may be formed in any shape and at any position.

The second flow passage 85b extends in the orthogonal direction to the valve mechanism accommodating hole 90 and the first flow passage 85a. In FIG. 2, the second flow passage 85b is configured to extend in the right direction. Herein, a condition as shown in FIG. 2 is a condition where the valve mechanism 1 provides communication between the first flow passage 85a and the second flow passage 85b. Therefore, the high pressure hydrogen stored in the internal space 102 of the high pressure tank 101 is supplied through the first flow passage 85a to the second flow passage 85b.

[Valve Mechanism]

Figure 5:
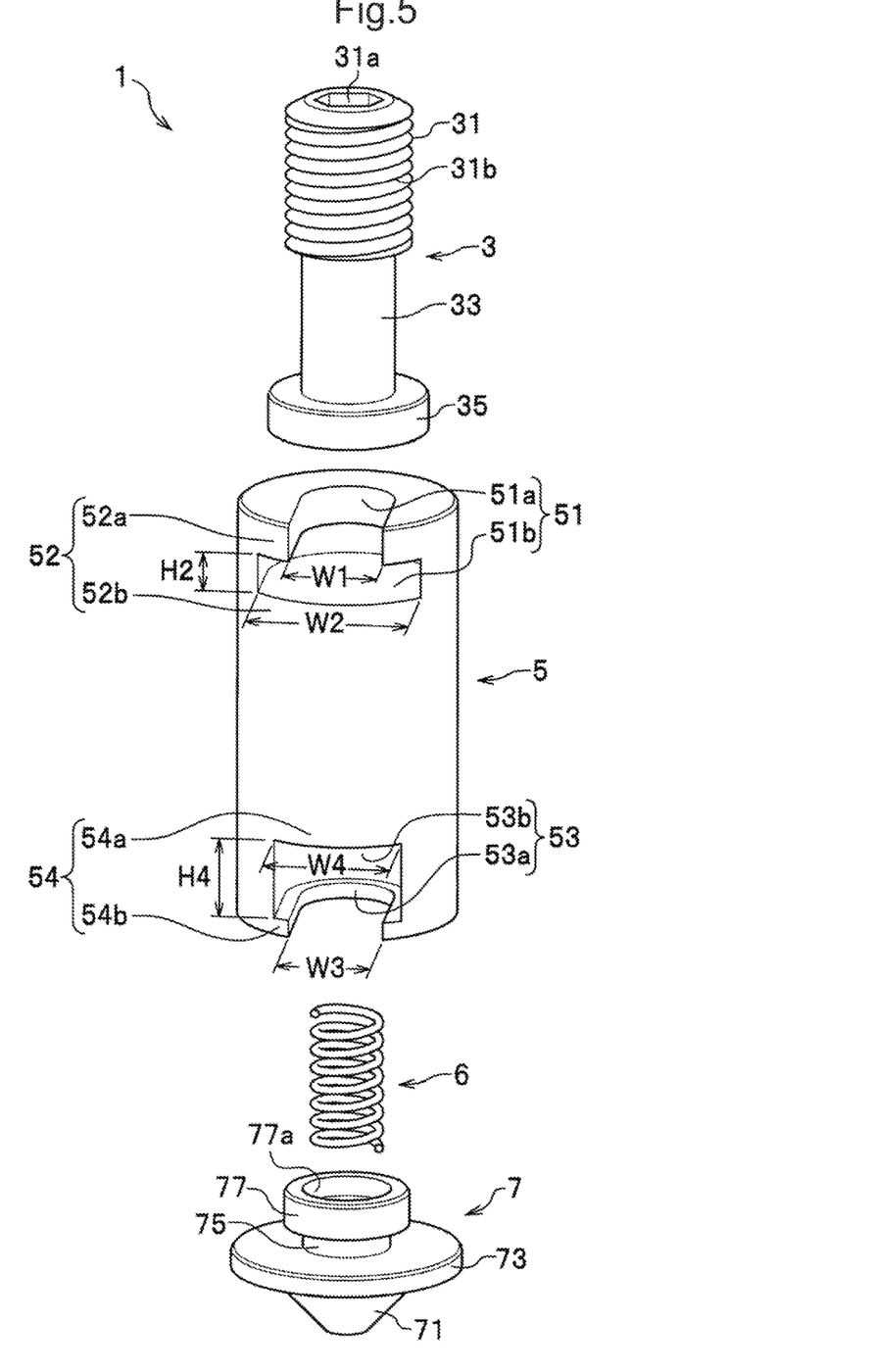

Next, the valve mechanism 1 of this embodiment will be explained with reference to FIG. 5. The valve mechanism 1 of this embodiment includes mainly four component parts. That is to say, the valve mechanism 1 includes the first plunger 3, the second plunger 5 to be engaged with the first plunger 3, the valve element 7 to be engaged with the second plunger 5, and an elastic body 6 which is arranged between the second plunger 5 and the valve element.

[First Plunger]

The first plunger 3 includes a cylindrical head portion 31 formed with a hexagonal hole 31a in the interior thereof, a columnar barrel portion 33 which is smaller in diameter than the head portion 31, and the flange portion 35 formed below the barrel portion 33. The hexagonal hole 31a is a part into which a tool such as a hexagonal wrench or the like is inserted. However, the hole of the head portion 31 is not limited to the hexagonal hole, and a hole of triangular shape, square shape or star shape for example may be employed. Moreover, a male threaded portion 31b is formed on at least a part of an outer peripheral surface of the head portion 31. Further, the flange portion 35 is of a disc shape and has a diameter which is larger than the diameter of the barrel portion 33. In the first plunger 3 of this embodiment, the barrel portion 33 is smallest in diameter, and the diameters of the head portion 31 and the flange portion 35 are substantially the same size.

[Valve Element]

The valve element 7 is configured to be seated on and separated from the valve seat 85c (see FIG. 2) formed in the flow passage 85 to be referred to later, so as to switch between the communication and the shut off of the flow passage 85. The valve element 7 includes the inverted truncated cone shaped valve portion 71 having one side (lower side) of smaller diameter and the other side (upper side) of larger diameter, a disc portion 73 located above the valve portion 71, a valve element neck portion 75 located above the disc portion 73, and a valve element head portion 77 located above the valve element neck portion 75. With respect to dimensions of the respective portions, the disc portion 73 has the largest diameter. In addition, the diameter of an upper end of the valve portion 71 is close to the diameter of the disc portion 73. The valve element head portion 77 has the next largest diameter. The diameter of the valve element head portion 77 is about a half of the disc portion 73. However, the diameter of the valve element head portion 77 will not be especially limited. Further, the valve element neck portion 75 has the smallest diameter.

In the interior of the valve element head portion 77, there is formed a bottomed spring receiving part 77a which opens toward the second plunger 5. This spring receiving part 77a is provided for allowing an end of the elastic body (compressed coil spring) 6 to be referred to later, to be inserted thereinto. Therefore, the inner diameter of the spring receiving part 77a is slightly larger than the diameter of the elastic body 6. Preferably, material of the valve element 7 is required to have such strength as not to be deformed large by contact with the valve seat 85c. In this embodiment, the material of the valve element is polyimide, polyamide-imide, etc.

[Second Plunger]

The second plunger 5 is member of substantially columnar shape which has the diameter larger than the diameter of the flange portion 35 of the first plunger 3. Then, at one end (upper end) and the other end (lower end) of the second plunger 5, there are formed a notch 51 for the first plunger and a notch 53 for the valve element. The first plunger notch 51 is composed of a first notch section 51a into which the barrel portion 33 of the first plunger 3 is fitted and a second notch section 51b into which the flange portion 35 of the first plunger 3 is fitted. The first notch section 51a and the second notch section 51b each have opening portions whose widths W1, W2 are slightly larger than the diameters of the barrel portion 33 and the flange portion 35 of the first plunger 3 so as to allow the barrel portion 33 and the flange portion 35 to be inserted from the lateral side of the second plunger 5. Moreover, the width W1 of the first notch portion is narrower than the diameter of the flange portion 35. Thus, in FIG. 5, a first engaging portion 52a is formed above the second notch section 51b, and a second engaging portion 52b is formed below the second notch section 51b. One end engaging part 52 is formed by these first engaging portion 52a and second engaging portion 52b. Therefore, when the flange portion 35 of the first plunger 3 is engaged with the one end engaging part 52, the first plunger 3 and the second plunger 5 are not disengaged in the axial direction of the valve mechanism 1.

Further, the position and size of the first plunger notch 51 are configured such that, when the first plunger 3 is engaged with the one end engaging part 52 of the second plunger 5, center axes in the longitudinal direction of the two plungers are substantially coaxial with each other. However, the inner diameters of the first notch section 51a and the second notch section 51b may be formed larger than the diameters of the barrel portion 33 and the flange portion 35 of the first plunger 3 in the range not disturbing the valve movement. This is because the first plunger 3 and the second plunger 5 become in coaxial relation when these plungers are accommodated in the valve mechanism accommodating hole 90 to be referred to later. Moreover, the height H2 of the second notch section 51b is larger than the thickness of the flange portion 35 of the first plunger 3, and an axial clearance is formed between the one end engaging part 52 and the flange portion 35. In addition, the inner diameter of the second notch section 51b and the width W2 of the opening portion are configured to be larger in such an extent that a clearance is formed around an outer peripheral surface of the flange portion 35 of the first plunger 3. Therefore, when the first plunger 3 is rotated, the rotation of the flange portion 35 is not transmitted to the second plunger 5. In other words, the first plunger 3 and the second plunger 5 are engaged with each other in a relatively rotatable manner.

Further, the valve element notch 53 is composed of a third notch section 53a into which the valve element neck portion 75 fitted and a fourth notch section 53b into which the valve element head potion 77 is fitted. The third notch section 53a and the fourth notch section 53b each have opening portions whose widths W3, W4 are larger than the diameters of the valve element neck portion 75 and the valve element head portion 77 so as to allow the valve element neck portion 75 and the valve element head portion 77 to be inserted from the lateral side of the second plunger 5. Moreover, the width W3 of the third notch portion 53a is narrower than the diameter of the valve element head portion 77. Thus, a third engaging portion 54a is formed above the fourth notch section 53b, and a fourth engaging portion 54b is formed below the fourth notch section 53b. The other end engaging part 54 is formed by these third engaging portion 54a and fourth engaging portion 54b. Therefore, when the valve element 7 is engaged with the other end engaging part 54, the second plunger 5 and the valve element 7 are not disengaged in the axial direction of the valve mechanism 1. In addition, the height H4 of the forth notch section 53b is larger than the thickness of the valve element head portion 77. Therefore, a clearance in the axial direction is formed between the other end engaging part 54 and the valve element head portion 77. The second plunger 5 and the valve element 7 are configured in a relatively movable relation by this axial clearance.

[Elastic Body (Compressed Coil Spring)]

As shown in FIG. 2, a spring accommodating hole 55 is formed in the interior of the second plunger 5 above the valve element notch 53. This spring accommodating hole 55 is provided for accommodating a compressed coil spring constituting the elastic body 6. In other words, when the valve element 7 is engaged with the second plunger 5, a columnar space is formed by the spring receiving part 77a of the valve element 7 and the spring accommodating hole 55. The elastic body 6 is arranged in the columnar space. Since the elastic body 6 is constituted of the compressed coil spring, the elastic force is applied to the second plunger 5 and the valve element 7 in the direction to be separated from each other when the spring is arranged between the second plunger 5 and the valve element 7. Herein, in this embodiment, the inner diameter of an upper end portion of the spring accommodating hole 55 is smaller than other portions. The inner diameter of this upper end is substantially the same as the diameter of the elastic body 6. Therefore, when the elastic body 6 has been arranged, the elastic body 6 is retained by the upper end of the spring accommodating hole 55. Herein, the elastic body 6 is not limited to the coil spring, and any member may be employed when it has elasticity and resistance against the fluid (for example, hydrogen, etc.) to be used.

[Operation]

Next, the operation of the valve mechanism 1 and the valve device 8 will be explained with reference to FIGS. 2 and 3. FIG. 2, as referred to hereinabove, shows a state in which the valve mechanism 1 allows the flow passage 85 to be communicated (between the first flow passage 85a and the second flow passage). When the flow passage 85 is communicated, the interior of the first flow passage 85 and the interior of the second flow passage 85b have a pressure P1 of the internal space 102 of the high pressure tank 101.

Next, a process to be changed from a state of FIG. 2 to a state of FIG. 3 will be explained. In the state of FIG. 2, the tool such as the hexagonal wrench and the like is fitted into the hexagonal hole 31a of the first plunger 3, the hexagonal wrench is rotated clockwise through the operation of the operator. Then, the first plunger 3 is screwed inwardly in the axial direction (in the downward direction of the drawing) of the valve mechanism accommodating hole 90 while being rotated by the valve holder female threaded portion 81d. Accordingly, the second plunger 5 which is engaged with the flange portion 35 of the first plunger 3 is also moved downward in the axial direction of the valve mechanism accommodating hole 90. At that time, the upper side, across the seal member 87, of the second plunger 5 is the atmospheric pressure. On the other hand, the pressure P1 of the fluid within the flow passage 85 is applied to the lower side of the second plunger 5. Herein, the pressure P1 is a pressure which is higher than the atmospheric pressure. Therefore, the force in the valve opening direction is added to the second plunger 5, so that the lower surface of the flange portion 35 and the second engaging portion 52b are brought into contact with each other.

Then, the first plunger 3 and the second plunger 5 are engaged in the relatively movable relation. Therefore, the rotational movement of the first plunger 3 is not transmitted to the second plunger 5. Since the second plunger 5 is not rotated, the rotational movement is not transmitted also to the seal member 87 which is arranged around the outer peripheral part of the second plunger 5. Accordingly, the surface of the seal member 87 is effectively prevented from being damaged. In addition, since the second plunger 5 is not caused the relative rotation, it is sufficient that the rotational force which is applied to the first plunger 3 by the operator is a smaller force in comparison with the conventional valve mechanism.

Further, the elastic body 6 is provided between the second plunger 5 and the valve element 7. Therefore, the lower surface of the valve element head portion 77 makes contact with the fourth engaging portion 54b. In addition, the first plunger 3 is rotated until the valve element 7 is seated on the valve seat 85c. At that time, after the valve element 7 is seated on the valve seat 85c, there may be cases where the first plunger 3 is further screwed inwardly. In this case, the valve element head portion 77 is separated apart from the fourth engaging portion 54b and the elastic body 6 is compressed, so that the movement in the axial direction of the second plunger 5 is transmitted to the valve element 7 without being suddenly increased. On the other hand, the operator can recognize that the rotational torque has been increased at the time the elastic body 6 starts to be compressed. Thus, since the operator can recognize indirectly that the valve element 7 is seated on the valve seat 85c, he stops screwing operation of the first plunger 3. Therefore, it is possible to prevent the excessive contact force from being caused between the valve element 7 and the valve seat 85c.

Further, since the valve element 7 is not rotated at the time the valve body 7 is seated on the valve seat 85c, the relative rotation is not caused between the valve element 7 and the valve seat 85c. Accordingly, the valve portion 71 of the valve element 7 is moved in the axial direction of the valve mechanism accommodating hole 90 and merely comes into contact with the valve seat 85c. Like this, since the relative rotation is not caused between the valve element 7 and the valve seat 85c, the surface of the valve portion 71 of the valve element 7 is effectively prevented from being damaged. Particularly, the valve seat 85c formed in the flow passage 85 may be formed with a taper surface of narrow width so as to maintain the high airtightness. In such a case, when the valve element 7 is rotated relatively to the valve seat 85c, the valve portion 71 has a high possibility of being damaged. Accordingly, the valve device 8 of this embodiment not causing the relative rotation is effective particularly when being used for the high pressure tank 101 to which the high pressure is applied.

Figure 1:
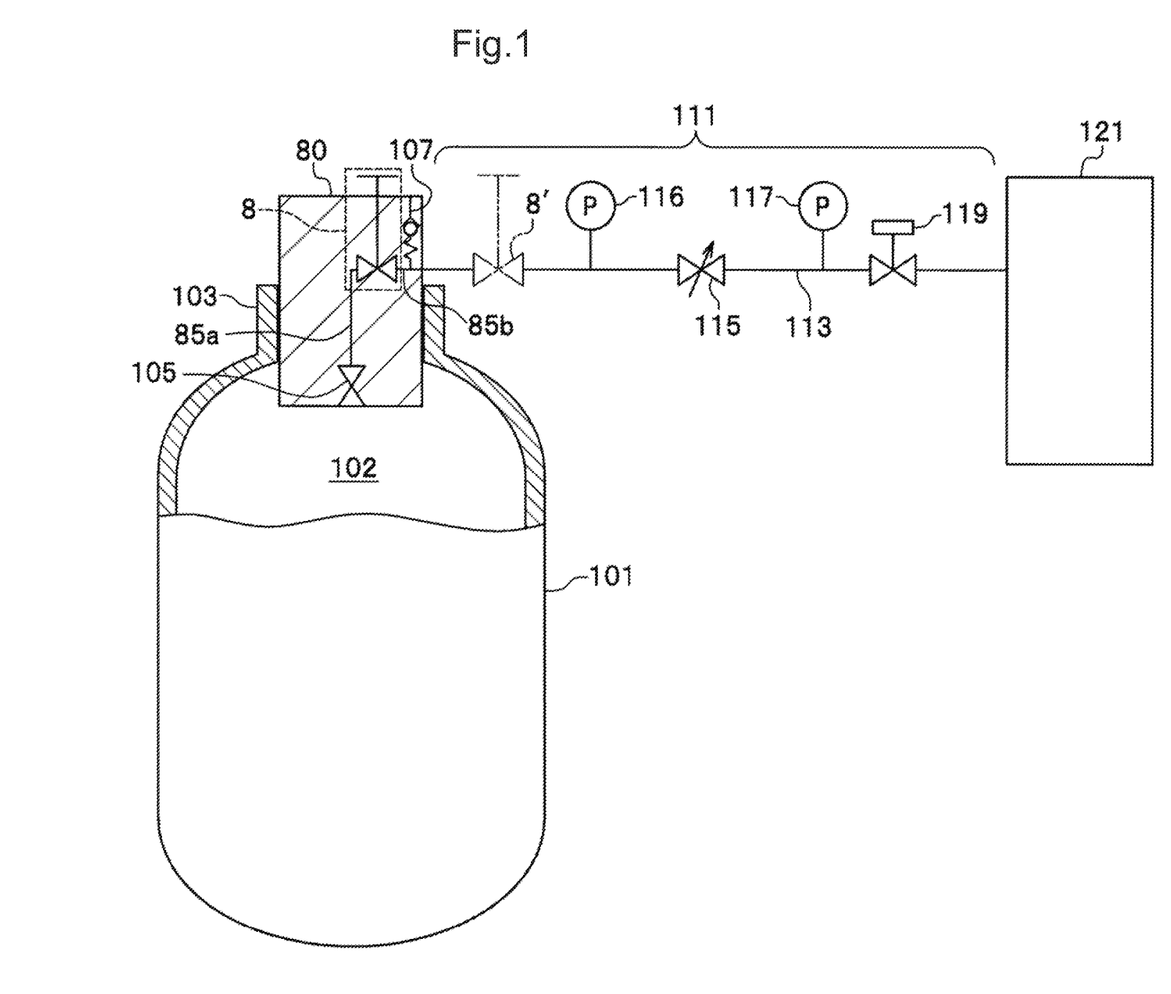

When the valve element 7 is seated on the valve seat 85c, the first flow passage 85a and the second flow passage 85b are shut off. The first flow passage 85a and the second flow passage 85b are shut off in order to fill high pressure gas from the filling flow passage 107 (see FIG. 1) into the second flow passage 85b thereby to carry out the airtight inspection of the piping system connected to the second flow passage 85b. In this case, the first flow passage 85a is the pressure P1 of the internal space 102 of the high pressure tank 101, and the second flow passage 85b is a pressure P2 of the fluid for the airtight inspection. The pressure P2 which is used for the airtight inspection is set to be higher than the pressure P1 of the internal space 102 of the high pressure tank 101. This is because the leakage of the piping system 111 can be surely inspected by applying a higher pressure than the pressure applied in the normal use condition, to the piping system 111.

Figure 4:
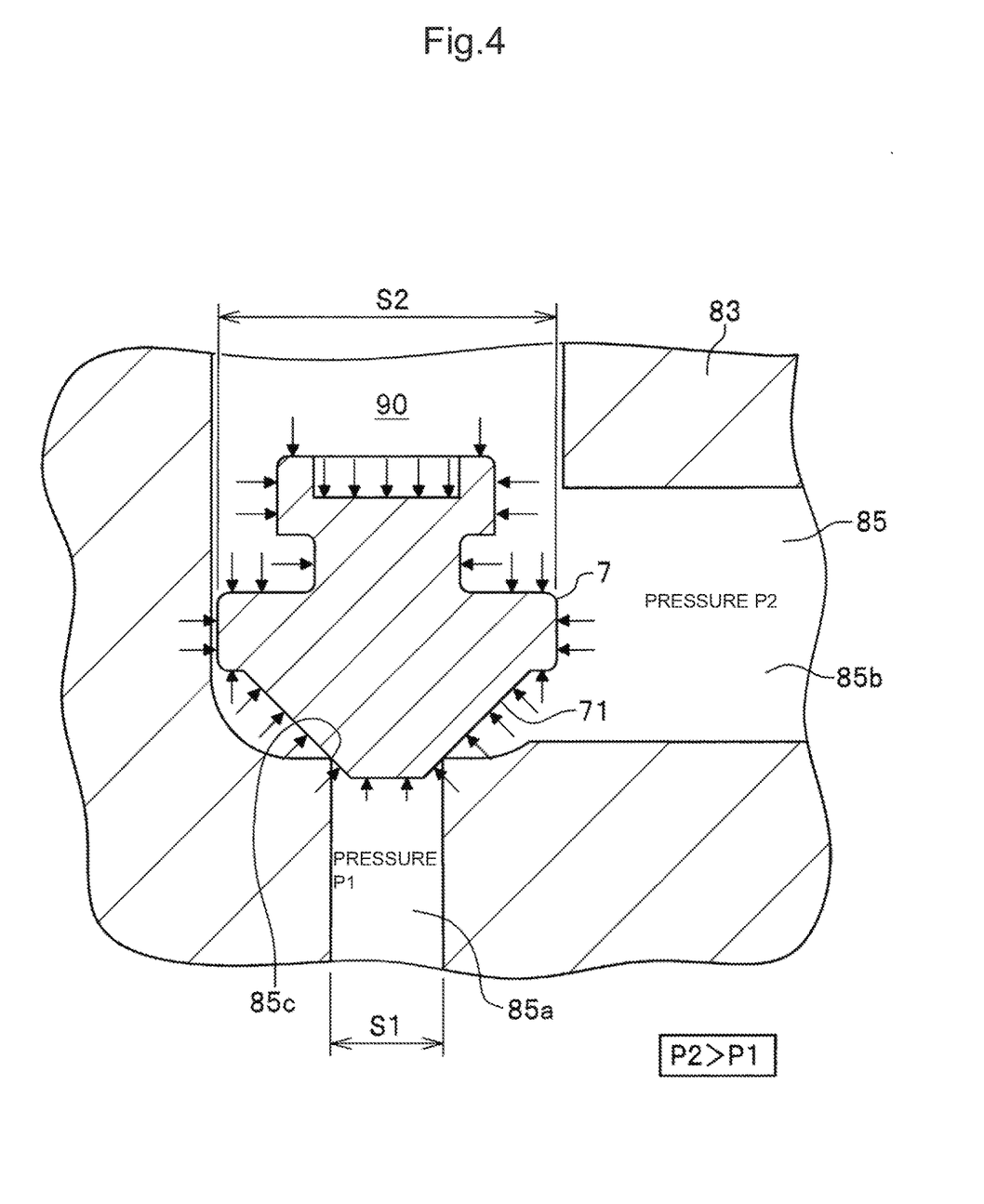

In the valve device 8 of this embodiment, since the valve element 7 is provided separately relative to the second plunger 5, the following peculiar effects are obtained. When focusing on the valve element 7 only, the pressures P1, P2 as shown by arrows in FIG. 4 are applied to the surface of the valve element 7 through the fluid by the second plunger 5 and the seam member 87. The force by which the fluid of the pressure P2 of the second flow passage 85b presses the valve element 7 in the valve closing direction (downward in the drawing) is S2×P2. Herein, S2 is a projected area when viewing the valve element 7 from the side of the valve element head portion 77 or the valve portion 71. The force by which the fluid of the pressure P2 of the second flow passage 85b presses the valve element 7 in the valve opening direction is (S2−S1)×P2, since the force is applied to a part removing an area S1 from an area S2. Herein, S1 is a projected area of a part of the valve element 7 surrounded by the valve seat 85c when viewing the valve element 7 from the side of the valve portion 71. Moreover, the force by which the fluid of the pressure P1 of the first flow passage 85a presses the valve element 7 in the valve opening direction is S1×P1. Herein, the force applied to the valve element 7 in the downward direction (in the direction facing toward the valve seat) is referred to as valve closing force, while the force applied to the valve element 7 in the upward direction is referred to as valve opening force. Then, the force F deducting the valve opening force from the valve closing force is F=(S2×P2)−((S2−S1)×P2)−(S1×P1). When simplifying this, F=S1(P2−P1). At that time, assuming that P1=P2, F=0. Therefore, the force applied to the valve element 7 is balanced with respect to the axial direction.

On the other hand, when carrying out the airtight inspection of the piping system 111, the fluid of the pressure P2 which is higher than the pressure P1 of the internal space 102 of the high pressure tank 101 is filled into the second flow passage 85b. At that time, the force F by which the fluid presses the valve element 7 in the valve closing direction is F=S1(P2−P1). Herein, since P2>P1, F is always a positive value. In other words, as far as the condition of P2>P1 is satisfied, the valve closing force always acts on the valve element 7.

As described hereinbefore, at the time of the airtight inspection, the valve closing force always acts on the valve element 7. Therefore, without depending upon the valve closing force by screwing-in of the first plunger 3, the first flow passage 85a and the second flow passage 85b can be surely shut off. This is the peculiar effect by separating the valve element 7 from the second plunger 5. In addition, when the second flow passage 85b is filled with the fluid of the pressure P2, the pressure P2 is applied to the second plunger 5. By this pressure P2, the force in the valve opening direction is applied to the second plunger 5. Therefore, the second plunger 5 is moved slightly upwards in the valve mechanism accommodating hole 90. Then, the prescribed clearance is formed in the axial direction between the second plunger 5 and the valve element 7. This clearance is larger than a distance that the second plunger 5 is moved in the valve opening direction by increasing the pressure within the second flow passage 85b from P1 to P2. Therefore, the upward movement of the second plunger 5 is not transmitted to the valve element 7. The valve closing force caused by the pressure difference between the pressure P1 and the pressure P2 is maintained.

When terminating the airtight inspection, the fluid for airtight inspection is discharged from the second flow passage 85b. In the case of having discharged the fluid into the air, the pressure of the second flow passage 85b becomes the atmospheric pressure. Then, the force in the vale opening direction is applied to the valve element 7 by the fluid of the pressure P1 within the first flow passage 85a. However, the movement of the valve element 7 is prevented by the elastic force of the elastic body 6 and the axial force through the screw-in of the plunger 3. Thereafter, when the first plunger 3 is rotated in the counter clockwise direction, the first plunger 3 is moved in the valve opening direction. The valve element 7 is separated from the valve seat 85c by the movement of the first plunger 3. Consequently, the fluid (hydrogen) of the pressure P1 within the second flow passage 85b flows in thereby to allow the interior of the second flow passage 85b to become the same pressure while decreasing the pressure P1. Then, the valve element 7 is moved in the valve opening direction along with the second plunger 5 while being supported by the fourth engaging portion 54b. By the way, it is conceivable that all the fluid within the high pressure tank 101 is discharged thereby to allow the interior of the high pressure tank 101 to become the atmospheric pressure. In this case, the force in the valve opening direction is not applied to the second plunger 5. Also in this case, the first engaging portion 52a comes into contact with the flange portion 35 of the first plunger 3, so that the second plunger 5 is moved in the valve opening direction.

Further, as described above, at the time of the airtight inspection, the pressure P2 of the fluid within the second flow passage 85b is configured to become higher than the pressure P1 of the fluid within the first flow passage 85a. However, there is a possibility that the heights of the pressures P1 and P2 are reversed due to unintended cause. In this case, the force pressing the valve element 7 upwardly is produced. Also in this case, since the axial force by the screw-in of the plunger 3 is set properly, the valve element 7 can be prevented from being suddenly moved upwardly.

Modified Example

By the way, in the above embodiment, the valve holder 81 and the valve body 83 are formed separately. However, without separating the valve holder 81 and the valve body 83, the body may be formed as an integral component part, and the valve mechanism accommodating hole 90 may be formed directly in this body 80. In this case, a female threaded portion for being screwed with the first plunger 3 is required to be formed in an inner surface of the valve mechanism accommodating hole 90 provided in the body 80. Further, the valve device is not necessarily required to be provided in the body 80. In other words, the valve device 8' (shown by a phantom line) may be provided in the piping system 111 on the further downstream side of the second flow passage 85b. However, in this case, the filling flow passage 107 also is required to be provided on the further downstream side of the valve device 8'.

Description of Reference Characters

1: Valve mechanism, 3: First plunger, 5: Second plunger, 52: One end engaging part, 54: The other end engaging part, 6: Elastic body (Compressed coil spring), 7: Valve element, 8: Valve device, 80: Body, 81: Valve holder, 83: Valve body, 85: Flow passage, 85a: First flow passage, 85b: Second flow passage, 90: Valve mechanism accommodating hole, 101: High pressure tank, 102: Internal space According to a first mode, there is provided a valve mechanism for a high pressure tank, which is accommodated in a valve accommodating hole communicating with a flow passage through which prescribed fluid flows, comprising a first plunger configured to be engaged with a threaded portion formed on at least a part of an inner wall of the valve mechanism accommodating hole and to be moved by rotation in the valve mechanism accommodating hole, a second plunger configured to be engaged at one end thereof with the first plunger in a relatively rotatable manner, a seal member being in contact with a periphery of the second plunger, and a valve element configured to be engaged with the other end of the second plunder and to be seated on and separated from a valve seat which is formed in the flow passage. With this configuration, even if the first plunger is rotated, the rotation is not transmitted to the second plunger.

According to a second mode, in addition to the configuration of the first mode, the second plunger and the valve element are provided in a relatively movable relation, and an elastic body which applies elastic force in such a direction as to separate the second plunger and the valve element is provided between the second plunger and the valve element. With this configuration, even if the first plunger is further screwed in after the valve element is seated on the valve seat, the movement in the axial direction of the second plunger 5 is not directly transmitted to the valve element since the elastic body 6 is compressed. Therefore, strong contact pressure is prevented from being generated between the valve element and the valve seat. In addition, even if force by which the valve element is pushed upwardly is caused due to sudden movement, etc. of internal fluid when the valve is opened, the valve element is prevented from being suddenly moved upward and causing irregular movement.

According to a third mode, a valve device for the high pressure tank comprises the valve mechanism of the first mode or the second mode, a body being formed with the vale mechanism accommodating hole, the flow passage through which the fluid flows being formed in the interior of the body, and the valve seat being formed in the flow passage so as to carry out communication and shut off of the flow passage in cooperation with the valve element. Although the seal member is located between the outer periphery of the second plunger and the body, since the second plunger is not rotated, the force in the rotational direction is not applied to the seal member arranged on the periphery of the second plunger. Therefore, the seal member is effectively prevented from being damaged. Moreover, since the force for rotating the second plunger which is in contact with the seal member is not required, the force for rotating the first plunger can be reduced.

According to a fourth mode, in addition to the configuration of the third mode, the flow passage includes a first flow passage configured to communicate with an internal space of the high pressure tank and a second flow passage configured to communicate with the exterior of the high pressure tank. The valve seat is provided in the boundary between the first flow passage and the second flow passage. In the airtight inspection of a piping system connected to the second flow passage, the pressure of the fluid within the second passage is higher than the pressure of the fluid within the first flow passage. With this configuration, although the pressure of the fluid within the first flow passage and the pressure of the fluid within the second flow passage are applied to a surface of the valve element, since the pressure of the fluid within the second flow passage is higher, the force (valve closing force) which presses the valve element against the valve seat is larger than the force (valve opening force) which separates the valve element from the valve seat. Therefore, in the airtight inspection, the valve element is seated on the valve seat without relying on the contact pressure caused between the valve body and the valve seat by screwing in the first plunger, whereby it is possible to maintain an airtight condition.

According to the present embodiments, the force by rotation is not applied to the seal member and the valve member. Therefore, the seal member and the valve element can be prevented from being damaged. Further, since the force in the valve closing direction is applied to the valve element, the large contact pressure is not required to be applied by the first plunger.

Obviously, numerous modifications and variations of the present invention are possible in light of the above teachings. It is therefore to be understood that within the scope of the appended claims, the invention maybe practiced otherwise than as specifically described herein.

What is claimed is:

1. A valve mechanism for a high pressure tank, which is accommodated in a valve accommodating hole communicating with a flow passage through which prescribed fluid flows, comprising:
   a first plunger configured to be engaged with a threaded portion formed on at least a part of an inner wall of the valve mechanism accommodating hole and to be moved by rotation in the valve mechanism accommodating hole;
   a second plunger configured to be engaged and coupled at one end thereof with the first plunger in a relatively rotatable manner;
   a seal member being in contact with a periphery of the second plunger; and
   a valve element configured to be engaged with the other end of the second plunger and to be seated on and separated from a valve seat which is formed in the flow passage,
   wherein the first plunger includes a columnar barrel portion and a flange portion, a flange diameter of the flange portion being larger than a barrel diameter of the columnar barrel portion,
   wherein the second plunger includes a first notch section and a second notch section that are provided at the one end of the second plunger, the first notch section and the second notch section each having an opening on a lateral side of the second plunger, the columnar barrel portion fitting into the first notch section, the flange portion fitting into the second notch section,
   wherein the first notch section has a width smaller than the flange diameter,
   wherein the valve element includes a neck portion and a head portion, a head diameter of the head portion being larger than a neck diameter of the neck portion,
   wherein the second plunger includes a third notch section and a fourth notch section that are provided at the other end of the second plunger, the third notch section and the fourth notch section each having an opening on a lateral side of the second plunger, the neck portion fitting into the third notch section, the head portion fitting into the fourth notch section, and
   wherein the third notch section has a width smaller than the head diameter.

2. The valve mechanism according to claim 1, wherein the second plunger and the valve element are provided in a relatively movable relation, and an elastic body which applies elastic force in such a direction as to separate the second plunger and the valve element is provided between the second plunger and the valve element.

3. A valve device for a high pressure tank comprising:
   the valve mechanism according to claim 1;
   a body being formed with the valve mechanism accommodating hole;
   the flow passage through which the fluid flows being formed in the interior of the body; and
   the valve seat being formed in the flow passage so as to carry out communication and shut off of the flow passage in cooperation with the valve element.

4. The valve device according to claim 3, wherein the flow passage includes a first flow passage configured to communicate with an internal space of the high pressure tank and a second flow passage configured to communicate with the exterior of the high pressure tank, wherein the valve seat is provided in the boundary between the first flow passage and the second flow passage, and wherein the flow passage is configured such that during an airtight inspection of a piping system connected to the second flow passage, the pressure of fluid within the second passage is higher than the pressure of fluid within the first flow passage.

5. The valve mechanism according to claim 1, wherein the first plunger is directly connected to the second plunger.

6. A valve mechanism comprising:
   a first plunger provided in a flow passage and having a thread around an axis of the first plunger, the thread engaging with a threaded portion provided on an inner wall of the flow passage, the first plunger being movable along the axis by rotating around the axis;
   a second plunger provided in the flow passage and having a first end and a second end opposite to the first end along the axis, the first end engaging and coupling with the first plunger such that the first plunger is relatively rotatable with respect to the second plunger and the second plunger is movable along the axis by rotating the first plunger;
   a seal member provided to surround the second plunger around the axis so as to contact a circumferential outer surface of the second plunger; and
   a valve element provided in the flow passage and having a forward end and a back end opposite to the forward end along the axis, the back end engaging with the second end of the second plunger such that the valve element is movable along the axis according to movement of the second plunger so as to be seated on and separated from a valve seat which is provided in the flow passage, wherein the first plunger includes a columnar barrel portion and a flange portion, a flange diameter of the flange portion being larger than a barrel diameter of the columnar barrel portion, wherein the second plunger includes a first notch section and a second notch section that are provided at the first end of the second plunger, the first notch section and the second notch section each having an opening on a lateral side of the second plunger, the columnar barrel portion fitting into the first notch section, the flange portion fitting into the second notch section, wherein the first notch section has a width smaller than the flange diameter, wherein the valve element includes a neck portion and a head portion, a head diameter of the head portion being larger than a neck diameter of the neck portion, wherein the second plunger includes a third notch section and a fourth notch section that are provided at the second end of the second plunger, the third notch section and the fourth notch section each having an opening on a lateral side of the second plunger, the neck portion fitting into the third notch section, the head portion fitting into the fourth notch section, and wherein the third notch section has a width smaller than the head diameter.

7. The valve mechanism according to claim 5, wherein the second plunger and the valve element are provided in a relatively movable relation, and an elastic body which applies elastic force in such a direction as to separate the second plunger and the valve element is provided between the second plunger and the valve element.

8. A valve device for a high pressure tank comprising:

the valve mechanism according to claim 5;

a body being formed with the flow passage;

the flow passage through which the fluid flows being formed in the interior of the body; and the valve seat being formed in the flow passage so as to carry out communication and shut off of the flow passage in cooperation with the valve element.

9. The valve device according to claim 8, wherein the flow passage includes a first flow passage configured to communicate with an internal space of the high pressure tank and a second flow passage configured to communicate with the exterior of the high pressure tank, wherein the valve seat is provided in the boundary between the first flow passage and the second flow passage, and wherein the flow passage is configured such that during an airtight inspection of a piping system connected to the second flow passage, pressure of fluid within the second passage is higher than pressure of fluid within the first flow passage.

10. The valve mechanism according to claim 6, wherein the flow passage is connected to a high pressure tank.

11. The valve mechanism according to claim 6, wherein the threaded portion is provided on at least a part of the inner wall of the flow passage.

12. The valve mechanism according to claim 6, wherein the first plunger is directly connected to the second plunger.

* * * * *